US007048382B2

(12) United States Patent
Pate

(10) Patent No.: US 7,048,382 B2
(45) Date of Patent: May 23, 2006

(54) RECORDING LENGTH(S) OF TIME HIGH-TEMPERATURE COMPONENT OPERATES IN ACCORDANCE WITH HIGH-TEMPERATURE POLICY

(75) Inventor: Michael A. Pate, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/280,683

(22) Filed: Oct. 26, 2002

(65) Prior Publication Data

US 2004/0080717 A1 Apr. 29, 2004

(51) Int. Cl.
*G03B 21/16* (2006.01)

(52) U.S. Cl. ......................... 353/52; 353/122; 353/121

(58) Field of Classification Search ................. 353/52, 353/85, 86, 54, 57–61, 97, 121, 122; 362/6, 362/218, 264, 265, 294, 20, 21, 22, 580, 362/85, 276; 315/360, 291, 224, 307; 361/25–27, 361/37, 93, 8, 140; 399/32, 33, 44, 69, 70; 352/202, 203

See application file for complete search history.

(56) References Cited

U.S. PATENT DOCUMENTS

| | | | | |
|---|---|---|---|---|
| 5,136,397 | A * | 8/1992 | Miyashita | 348/748 |
| 5,442,261 | A * | 8/1995 | Bank et al. | 315/307 |
| 5,491,540 | A | 2/1996 | Hirst | 355/200 |
| 5,783,909 | A | 7/1998 | Hochstein | |
| RE36,060 | E * | 1/1999 | Miyashita | 348/748 |
| 5,909,090 | A * | 6/1999 | Nakamura et al. | 315/307 |
| 6,039,430 | A | 3/2000 | Helterline et al. | 347/19 |
| 6,089,687 | A | 7/2000 | Helterline | 347/7 |
| 6,127,789 | A * | 10/2000 | Ishizuka et al. | 315/308 |
| 6,161,913 | A | 12/2000 | Childers et al. | 347/19 |
| 6,224,216 | B1 * | 5/2001 | Parker et al. | 353/31 |
| 6,333,602 | B1 | 12/2001 | Kayser | |
| 6,349,269 | B1 * | 2/2002 | Wallace, Jr. | 702/132 |
| 6,362,573 | B1 | 3/2002 | Helbing et al. | 315/155 |
| 6,373,201 | B1 | 4/2002 | Morgan et al. | 315/291 |
| 6,419,364 | B1 * | 7/2002 | Takizawa et al. | 353/52 |
| 6,547,400 | B1 * | 4/2003 | Yokoyama | 353/98 |
| 6,554,432 | B1 * | 4/2003 | Ohfune et al. | 353/57 |
| 6,634,757 | B1 * | 10/2003 | Asakawa | 353/85 |
| 6,648,475 | B1 * | 11/2003 | Roddy et al. | 353/31 |
| 6,736,514 | B1 * | 5/2004 | Horvath et al. | 353/31 |
| 2002/0113560 | A1 * | 8/2002 | Edwards et al. | 315/291 |
| 2003/0015973 | A1 * | 1/2003 | Ovens et al. | 315/291 |

FOREIGN PATENT DOCUMENTS

| | | |
|---|---|---|
| EP | 1006734 A2 | 6/2000 |

OTHER PUBLICATIONS

Angela Olson, "Calculus Made Easier," http://www.wtv-zone.com/Angelaruth49/, printed and accessed on Oct. 7, 2005.

"Engineering Maths First Aid Kit," section 8.2.1, copyright Perason Education Limited, year 2000.

* cited by examiner

*Primary Examiner*—W. B. Perkey
*Assistant Examiner*—Andrew Sever

(57) ABSTRACT

A method of one embodiment is disclosed that records one or more lengths of time a high temperature component of a device operates in accordance with a high-temperature policy. An action is performed in response to at least one of the lengths of time being greater than corresponding threshold lengths of time.

46 Claims, 5 Drawing Sheets

RECORDING LENGTH(S) OF TIME HIGH-TEMPERATURE COMPONENT OPERATES IN ACCORDANCE WITH HIGH-TEMPERATURE POLICY

BACKGROUND

Projector systems are generally devices that integrate light sources, optics systems, electronics, and light modulators for projecting data such as images, video, documents, and spreadsheets from computers or video devices onto walls or front or rear screens, for large-image viewing. They are especially popular among business users who give presentations as part of their job responsibilities. Newer projectors can weigh as little as a few pounds, making them well suited for business travelers. As the quality of projection technology has improved, projectors are also finding their way into peoples' homes for high-definition television (HDTV) and other home entertainment applications. Some industry pundits predict that digital projectors will also become the standard projection technology used in movie theaters.

A projector commonly includes a light source, such as a light bulb, that is a high-temperature component of the projector. The light bulb is a high-temperature component in that it operates at a high temperature. For instance, the outer envelope of the burner of the light bulb can reach approximately 950° C., for long lengths of time. The useful lifetime of the light bulb is commonly considered to be measured as the length of time the projector of which it is a part is operating. However, more accurately, the useful lifetime of the light bulb is measured as the length of time it is operating at a high temperature. When the useful lifetime of the light bulb has expired, it usually needs to be replaced with a fresh bulb in the projector in order for the projector to continue performing optimally. One definition of end of bulb life is when light output is at fifty percent of its initial value.

SUMMARY OF THE INVENTION

A method of one embodiment records one or more lengths of time a high temperature component of a device operates in accordance with a high-temperature policy. An action is performed in response to at least one of the lengths of time being greater than corresponding threshold lengths of time.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part thereof, and in which is shown by way of illustration specific exemplary embodiments in which the invention may be practiced. These embodiments are described in sufficient detail to enable those skilled in the art to practice the invention. Other embodiments may be utilized, and logical, mechanical, electrical, electro-optical, software/firmware and other changes may be made without departing from the spirit or scope of the present invention. The following detailed description is, therefore, not to be taken in a limiting sense, and the scope of the present invention is defined only by the appended claims.

Overview and Method of Use

Figure 1:
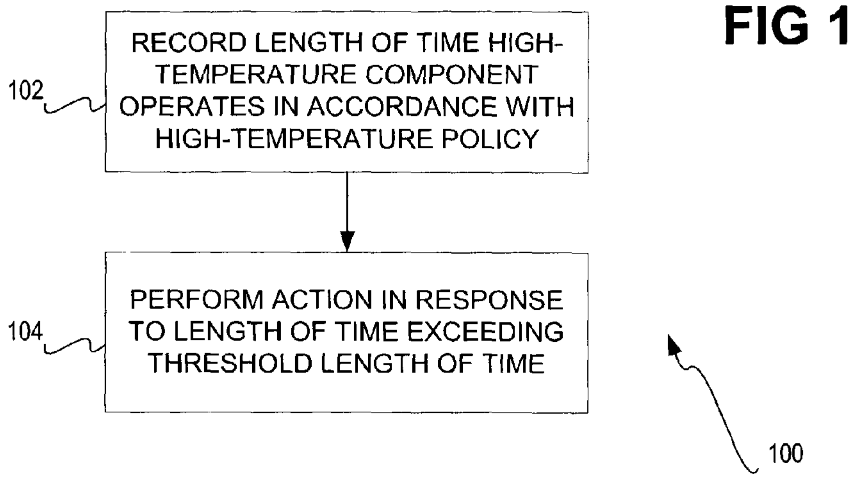
FIG. 1 is a flowchart of a method according to an embodiment of the invention.

FIG. 1 shows a method 100 according to an embodiment of the invention. The length of time a high-temperature component of a device operates in accordance with a high-temperature policy is recorded (102). The length of time is more generally information regarding the operation of the high-temperature component in accordance with the high-temperature policy. The high-temperature component may be the projector light source assembly, including a light bulb, of a projection system, or projector. The high-temperature component may also be another type of component or device of a different type of system. Other types of such components and/or devices include automotive brake assemblies, cutting tools for high precision manufacturing such as single point diamond turning, bearings or moving components on transportation vehicles, such as on trains, transmission, engines, and heavy equipment, and so on.

The high-temperature component is one that normally operates at a high temperature relative to other components in the system or device of which it is a part. The high-temperature component is also often the largest source of heat in the system and may have to be cooled to regulate the system temperature. If the regulation system or mechanism fails, the high-temperature component may become undesirably hot. The high-temperature policy generally deems whether the high-temperature component is operating at a high temperature. Specific examples of high-temperature policies are described later in the detailed description.

The length of time the component operates in accordance with the policy may be recorded over a number of uses of the device of which the component is a part. For instance, the device may be turned on, such that the component heats up and ultimately operates in accordance with the high-temperature policy. The device is then turned off, or just the component itself is turned off, and the temperature of the component cools down to where it no longer operates in accordance with the high-temperature policy. The length of time that the component operates in accordance with the high-temperature policy is the sum of the individual lengths of time the component operates in accordance with the policy over all the times the component is being used. Furthermore, the length of time may be recorded in a non-volatile memory of the high-temperature component that is removed and reinstalled at a later date or shared among other like machines that use the same high-temperature component.

When the length of time the high-temperature component has operated in accordance with the high-temperature policy is greater than a threshold length of time, an action is performed (104). For instance, an indication may be made to the user of the device of which the component is a part that the component is nearing the end of its useful life period, and that it should be replaced in the device with a new high-temperature component. Other types of actions may also be performed when the length of time the component has operated in accordance with the policy has exceeded the threshold length of time.

Such other types of actions include providing safety notices by email to a device manager or a safety manager, and providing a predictive maintenance notice. Still other types of such actions include providing delivery of an automated purchase order to a part vendor, disabling the device of a life-critical system on the next system start up, providing a sub-optimal operation notice for brand-protection purposes, and so on. Depending on the type of component, the threshold length of time may be measured in seconds, hours, days, weeks, months, years, and so on.

Figure 2:
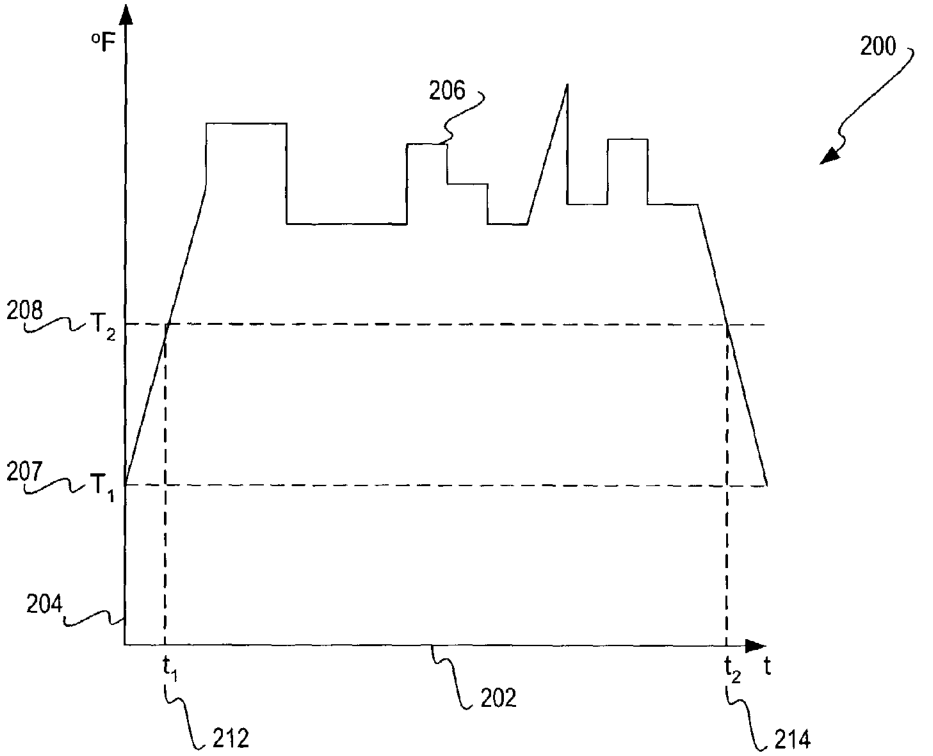
FIG. 2 is a graph in conjunction with which a high-temperature policy is described, according to an embodiment of the invention.

FIG. 2 shows a graph 200 in conjunction with which a high-temperature policy according to a specific embodiment of the invention is described. The graph 200 measures temperature on the y-axis 204 as a function of time on the x-axis 202. The line 206 is representative of a typical usage of a device that includes a high-temperature component, and specifically represents the operating temperature of the high-temperature component of the device. When the device is turned on, the high-temperature component has an ambient temperature $T_1$, as indicated by the reference number 207. Depending upon machine operation, utilization, and load duty cycle, the graph 200 may have a non-uniform temperature profile above the ambient temperature $T_1$.

As the component heats up, at time $t_1$, indicated by the reference number 212, its temperature reaches a threshold temperature $T_2$, indicated by the reference number 208. The high-temperature component continues to heat up, and then typically cools and heats in accordance with its environment and other operational and use factors, as indicated by the jagged nature of the line 206. When the device of which the component is a part, or just the component itself, is turned off, the component begins to cool down, until its temperature drops below the threshold temperature $T_2$, at time $t_2$ indicated by the reference number 214, and reaches the ambient temperature $T_1$ again.

The length of time the temperature of the high-temperature component is greater than the threshold temperature $T_2$ is specifically recorded as the length of time the high-temperature component is operating in accordance with the high-temperature policy. This is the period of time equal to the time $t_2$ minus the time $t_1$. Thus, in the embodiment of FIG. 2, the high-temperature policy deems that the component has an operating temperature greater than the threshold temperature $T_2$. The threshold temperature can be referred to as a temperature on-off set point.

It is noted that the component may be operating in accordance with the policy even where the component or the device of which it is a part has been turned off, since the operation of the component in accordance with the policy generally considers the temperature of the component, and not necessarily whether the component itself is on or off. The threshold temperature $T_2$ may be a preset variable or a preset non-changeable temperature threshold. That is, the user may be able to change the threshold temperature $T_2$, or the temperature may be preset depending on the type of the high-temperature component and not user changeable, as well as may be preset depending on the environment in which the component is used.

The high-temperature policy that has been thus far described records one length of time, the length of time the component operates greater than a threshold temperature. Thus, an action may be performed where this length of time is greater than a corresponding threshold length of time. However, in other embodiments of the invention, the high-temperature policy may necessitate the recording of more than one length of time, as is described in detail beginning with the next paragraph of the detailed description. In such embodiments, an action may be performed where at least one of these lengths of time are greater than corresponding threshold lengths of time.

Figure 3:
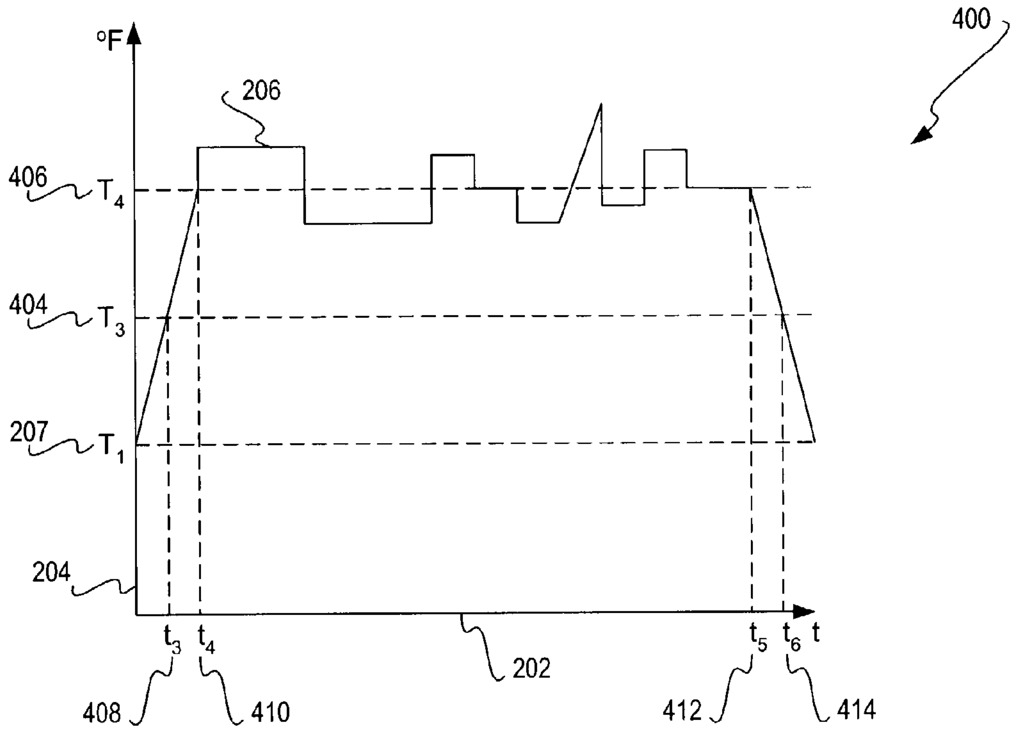
FIG. 3 is a graph in conjunction with which other high-temperature policies are described, according to varying embodiments of the invention.

FIG. 3 shows a graph 400 in conjunction with which other high-temperature policies, according to varying embodiments of the invention, are described. The graph 400 measures temperature on the y-axis 204 as a function of time on the x-axis 202. The line 206 is again representative of the typical usage of a device that includes a high-temperature component, and specifically represents the operating temperature of the high-temperature component of the device. When the device is turned on, the high-temperature component has an ambient temperature $T_1$, as indicated by the reference number 207. As the component heats up, at time $t_3$, indicated by the reference number 408, its temperature reaches a first threshold temperature $T_3$, indicated by the reference number 404.

Then, at time $t_4$, indicated by the reference number 410, the component's temperatures reaches a second threshold temperature $T_4$, indicated by the reference number 406. The temperature $T_4$ may be a very high temperature, above and below which the temperature of the component fluctuates during normal operation, as indicated by the jagged nature of the line 206. When the device of which the component is a part, or the component itself, is turned off, the component begins to cool, and its temperature first drops below the threshold temperature $T_4$, at time $t_5$ indicated by the reference number 412, and then drops below the threshold temperature $T_3$, at time $t_6$ indicated by the reference number 414, before again reaching the ambient temperature $T_1$.

Recording information regarding operation of the high-temperature component in accordance with the high-temperature policy in one embodiment of the invention is inclusive of recording two different lengths of time. First, the length of time that the component's temperature is above the temperature $T_3$ is recorded. Second, the length of time that the component's temperature is greater than the threshold temperature $T_4$ is also recorded. An action, as has been described, may be performed when at least one of these lengths of time exceed corresponding threshold lengths of time.

Recording both the length of time the operating temperature of the component is above the temperature $T_3$, and the length of time the operating temperature is above the temperature $T_4$, may be useful in determining the end of the useful life of the high-temperature component. This may also be useful when the component is improperly loaded or used, so that such activity can be detected. Both lengths of time may be useful, too, for training personnel, for equipment readjustment, or for preventative or reactive maintenance.

Furthermore, recording information regarding the operation of the high-temperature in accordance with the high-temperature policy in another embodiment of the invention encompasses recording a different length of time. This is the length of time the component's temperature is within a threshold temperature range specified as between the temperature $T_3$ and the temperature $T_4$. That is, the length of time the temperature of the component is greater than a first threshold temperature but less than a second threshold temperature is recorded.

Recording the length of time(s) a high-temperature component is operating in accordance with a high-temperature policy is a more useful predictor of useful lifetime of the component as compared to just recording the length of time the high-temperature component is operating. This is because the lifetime of such a component generally decreases as a result of its operating at a high temperature, and not just being on. Furthermore, since different high-temperature policies can be formulated in different embodiments of the invention that also record the lengths of time the component is operating above a first temperature threshold as well as above a second temperature threshold, if the component is exposed to very high temperatures—over the second threshold—the lifetime may be shortened even sooner.

Thus, utilizing a high-temperature policy in this regard allows for flexibility in determining how long the component was operating at a high temperature, as well as how long the component was operating at an extremely high temperature. There may be two associated threshold lengths of time, one for normal high temperature operation and one for extremely high temperature operation, that can be examined to determine whether an action should be performed, as well as a threshold for a combination of the lengths of time. The threshold time for extremely high temperature operation may be lower than the threshold time for normal high temperature operation, since such operation is more damaging to the high-temperature component usually, and ends its useful life much more quickly.

Furthermore, in an alternative embodiment of the invention, a temperature profile of the operating temperature of the high-temperature component over time is recorded, for later analysis or for training purposes, and is encompassed under 102 of the method 100 of FIG. 1, and its associated claim language. Such a temperature profile may include determining the integration of operating temperature of the high-temperature component over time. Determining and recording such a value is thus also encompassed under 102 of the method 100 of FIG. 1, and its associated claim language. This time-related value, subsumed under the nomenclature "length of time" for purposes of this application, can then be compared to a corresponding threshold to determine whether an action of some type should be performed.

Projection Systems, Light Source Assemblies, and Methods of Manufacture

Figure 4:
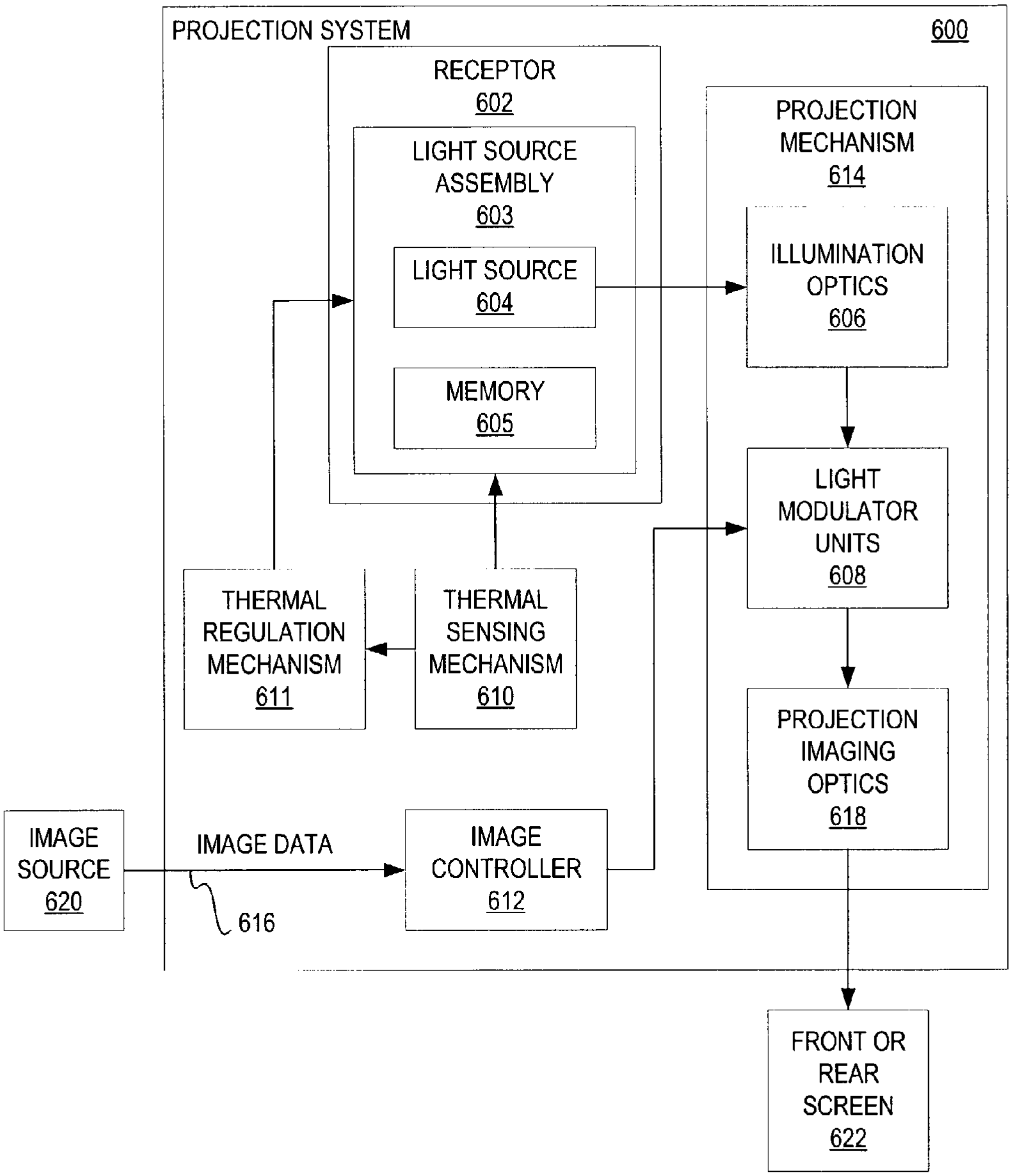
FIG. 4 is a block diagram of a projection system that includes a light source assembly, according to an embodiment of the invention.

FIG. 4 shows a block diagram of a projection system 600 according to an embodiment of the invention. The system 600 is one type of device that includes a high-temperature component that in conjunction with which embodiments of the invention can be implemented. The system 600 may be implemented as a projector. The projection system 600 includes a receptor 602 that is receptive to a projector light source assembly 603, a projector mechanism 614, a thermal sensing mechanism 610, a thermal regulation mechanism 611, and an image controller 612.

The projector light source assembly 603 provides the light used by the system 600 to project image data 616 from an image source 620 onto a front or rear screen 622. The image source 620 may be a computer, or another type of electronic and/or video device, where the image data 616 may be analog or digital data. The front or rear screen 622 is more generally that onto which the projection system 600 projects the image data 616 supplied by the image source 620. It can alternatively be a wall or other structural object, such as a curved simulator dome, and so on. The light source assembly 603 is removably insertable into the receptor 602 of the system 600, where the latter is receptive to the former geometry. The assembly 603 specifically includes a projector light source 604, such as a light bulb and optionally a reflector assembly. The light source 604 specifically, and the assembly 603 generally, is the high-temperature component of the projection system 600.

The projector light source assembly 603 also includes a non-volatile memory 605. The non-volatile memory 605 may be a semiconductor memory, a hard disk drive or other magnetic memory, or another type of non-volatile memory, such as the storage devices disclosed in the coassigned U.S. Pat. Nos. 6,089,687, 6,039,430, and 6,161,913. The memory 605 preferably stores the running length of time at which the light source 604 has operated in conjunction with a high-temperature policy, as has been described.

The memory 605 may also store other information regarding the light source 604 for use by the projection system 600, such as the type of the light source 604, its manufacturer, its estimated useful life, and so on. The memory 605 may further be used by the projection system 600 to record the length of time the light source 604 has operated on alternating current (AC) in conjunction with the high-temperature policy, on direct current (DC) in conjunction with the policy, the number of electrical spikes the system 600 encountered while the assembly 603 was operating therein, and so on. Furthermore, the temperature profile, which is the plot of temperature as a function of time, may also be recorded, for later operator analysis and training.

The thermal sensing mechanism 610 is the transducer of the system 600 that senses the length of time the projector light source 604 of the light source assembly 603 operates in accordance with a high-temperature policy, and that also preferably performs an action in response to this length of time exceeding a threshold length of time, as has been described in detail in previous sections of the detailed description. The mechanism 610 thus senses the temperature of the light source 604 of the assembly 603, and is able to read from and write to the non-volatile memory 605 of the assembly 603. Any other information read from and/or written to the non-volatile memory 605 is also preferably handled by the mechanism 610. Such information can include operating system information, how long power has remained off to the light source 604, and messages to be sent to the system 600.

The thermal regulation mechanism 611 cools the light source 604 of the light source assembly 603. The mechanism 611 may be one or more fans in one embodiment of the invention. The thermal sensing mechanism 610 preferably detects failure of the thermal regulation mechanism 611 in one embodiment, since such failure would likely cause the light source 604 and/or the system 600 to become damaged. The thermal sensing mechanism 610, upon detecting failure of the thermal regulation mechanism 611, may store information regarding the failure of the mechanism 611 in the non-volatile memory 605. Upon the next start-up of the system 600, the mechanism 610 then reads this information, and preferably prevents the light source 604 from turning on, or prevents the light source 604 from operating in accordance with the high-temperature policy, to prevent damage to the light source 604 and/or the system 600 itself. Alternatively, upon detecting failure of the thermal regulation mechanism 611, the thermal sensing mechanism 610 immediately turns off the light source 604 and/or the system 600.

The projection mechanism 614 projects light output by the projector light source 604 of the light source assembly 603 inserted into the receptor 602, in accordance with image data 616 supplied by the image source 620, for display outside the projection system 600 on the front or rear screen 622. The projection mechanism 614 specifically can include illumination optics 606, light modulator units 608, and projection imaging optics 618. The illumination optics 606 and 618 may each include one or more mirrors, one or more lenses, and/or one or more of other types of constituent components, such as refractive, diffractive, and/or reflective optics. The illumination optics 606 collect and deliver the light output by the light source 604 onto the light modulator units 608, whereas the projection imaging optics 618 image and project the light as processed by the light modulator units 608 externally from the system 600, such as onto the front or rear screen 622.

The light modulator units 608 may include one or more of liquid crystal display (LCD) units, spatial light modulators (SLM's), digital light processing (DLP) units, digital micromirror devices (DMD's), as well as other types of light modulator units. The image controller 612 controls the light modulator units 608 in accordance with the image data 616 supplied by the image source 620. For instance, the image controller 612 may control the light modulator units 608 so that they properly transmit, reflect, and/or modulate light in conjunction with the contrast and/or color values of the pixels of the image data 616, such as of the constituent color components of the pixels of the image data 616. As can be appreciated by those of ordinary skill within the art, there may be one or more light source assemblies per modulator, including case in which there is more than one light modulator per projector system.

Furthermore, as can be appreciated by those of ordinary skill within the art, the system 600 includes components specific to a particular embodiment of the invention. However, the system 600 may include other components in addition to or in lieu of the components depicted in FIG. 4. In addition, the device that supplies the image source 620 may also control the power to the light source 604, which may be able to be shut off independent of the projection system 600 itself.

Figure 5:
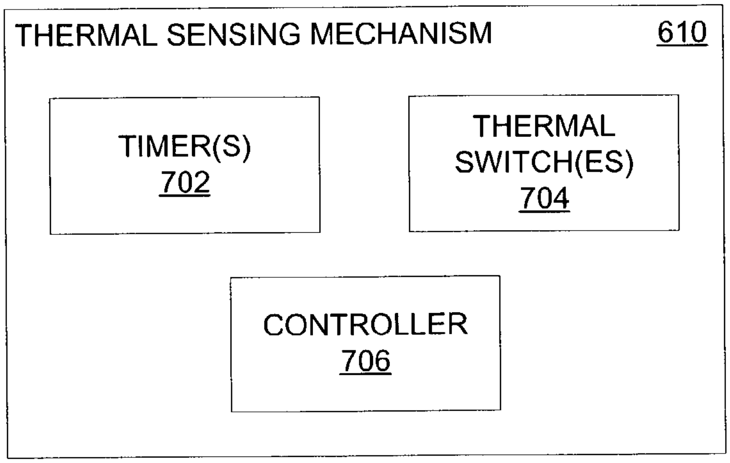
FIGS. 5 and 6 are block diagrams of the thermal sensing mechanism of the projection system of FIG. 4, according to varying embodiments of the invention.
Figure 6:
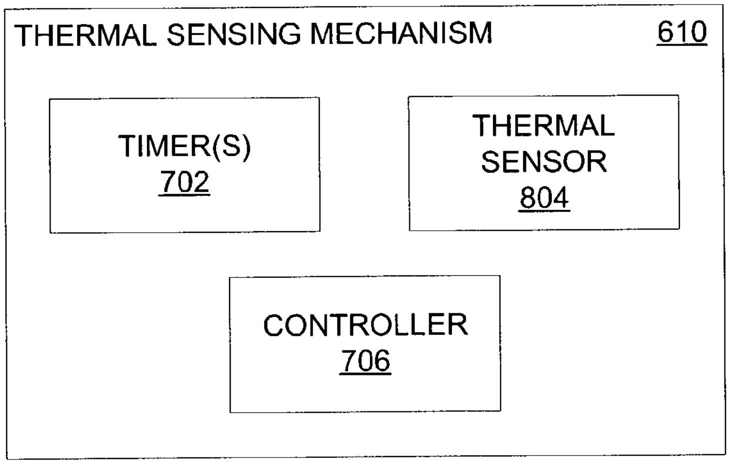

FIGS. 5 and 6 show differing implementations of the thermal sensing mechanism 610 of the projection system 600 of FIG. 4, according to varying embodiments of the invention. In each of the embodiments of FIGS. 5 and 6, the thermal sensing mechanism 610 includes timer(s) 702 and a controller 706. In the embodiment of FIG. 5 specifically, the thermal sensing mechanism 610 includes thermal switch(es) 704, whereas in the embodiment of FIG. 6 specifically, the thermal sensing mechanism 610 includes a thermal sensor 804. The components of the mechanism 610 are operatively or otherwise coupled to one another. Furthermore, the timer(s) 702 and controller 706 can each be implemented as hardware, software, or a combination of hardware and software.

The number of timer(s) 702 depends on the different lengths of time that are to be recorded. For instance, for a high-temperature policy that records the length of time that the temperature of the light source 604 has exceeded a given temperature threshold, or that records the length of time that the temperature is within a given temperature threshold range, there may be only one timer 702 to record this length of time. As another example, for a policy that records the length of time that the temperature is above a first temperature threshold and that records the length of time that the temperature above a second temperature threshold, there may be two of the timers 702. Thus, one of the timers 702 is for recording the former length of time, whereas the other of the timers 702 is for recording the latter length of time.

The thermal switch(es) 704 of FIG. 5 may each have an on-off set point corresponding to the temperature threshold of the high-temperature policy, such that the switch(es) 704 turn on when the corresponding temperature threshold is exceeded. Alternatively, the thermal switch(es) may have an on-off set range corresponding to the temperature threshold range of the high-temperature policy, such that the switch (es) 704 turn on when the temperature of the light source 604 is within this range. The number of the thermal switch(es) 704 thus may depend on the different lengths of time that are to be recorded by the timer(s) 702, such that there is a thermal switch 704 for each of the timers 702. Alternatively, the same thermal switch 704 may have multiple set points and/or set ranges and couple to more than one of the timers 702. In FIG. 6, the thermal sensor 804 detects, or measures, the operating temperature of the projector light source 604. The type of switch(es) 704 and the type of sensor 804 are not limited by embodiments of the invention, and may include optical, mechanical, electrical, and/or infrared switches and sensors, and so on.

The manner by which the embodiment of FIG. 5 can operate is now particularly described. Where there is one timer 702 and one thermal switch 704 programmed to a particular on-off set point or on-off set range, the thermal switch 704 turns on when the operating temperature of the light source 604 has exceed this set point or is within this range. The thermal switch 704 is coupled to the timer 702, such that the switch 704 turning on turns on the timer 702. When the temperature of the light source 604 falls below the set point or goes out of the range, then the switch 704 turns off, turning off the timer 702. Any additional timers 702 and/or switches 704 operate in a like manner. The controller 706 adds the length(s) of time recorded by the timer(s) 702 to running length(s) stored in the non-volatile memory 605. The controller 706 may also record in the memory 605 various waveforms, voltage and current levels, starting strike voltages, number of strikes needed to turn on the light source 604, and so on. Furthermore, the temperature profile, which is the plot of temperature as a function of time, may also be recorded, for later operator analysis and training.

The manner by which the embodiment of FIG. 6 can operate is now particularly described. The controller 706 receives the temperature of the light source 604 from the thermal sensor 804. The controller 706 turns on and off the timer(s) 702 in accordance with the high-temperature policy. Thus, the functionality of the thermal switch(es) 704 of the embodiment of FIG. 5 is assumed by the controller 706 in the embodiment of FIG. 8. The controller 706 of the embodiment of FIG. 5 still adds the length(s) of time recorded by the timer(s) 702 to running length(s) of time stored in the memory 605. The controller 706 may also record in the memory 605 various waveforms, voltage and current levels, starting strike voltages, number of strikes needed to turn on the light source 604, and so on. Furthermore, the temperature profile, which is the plot of temperature as a function of time, may also be recorded, for later operator analysis and training.

Figure 7:
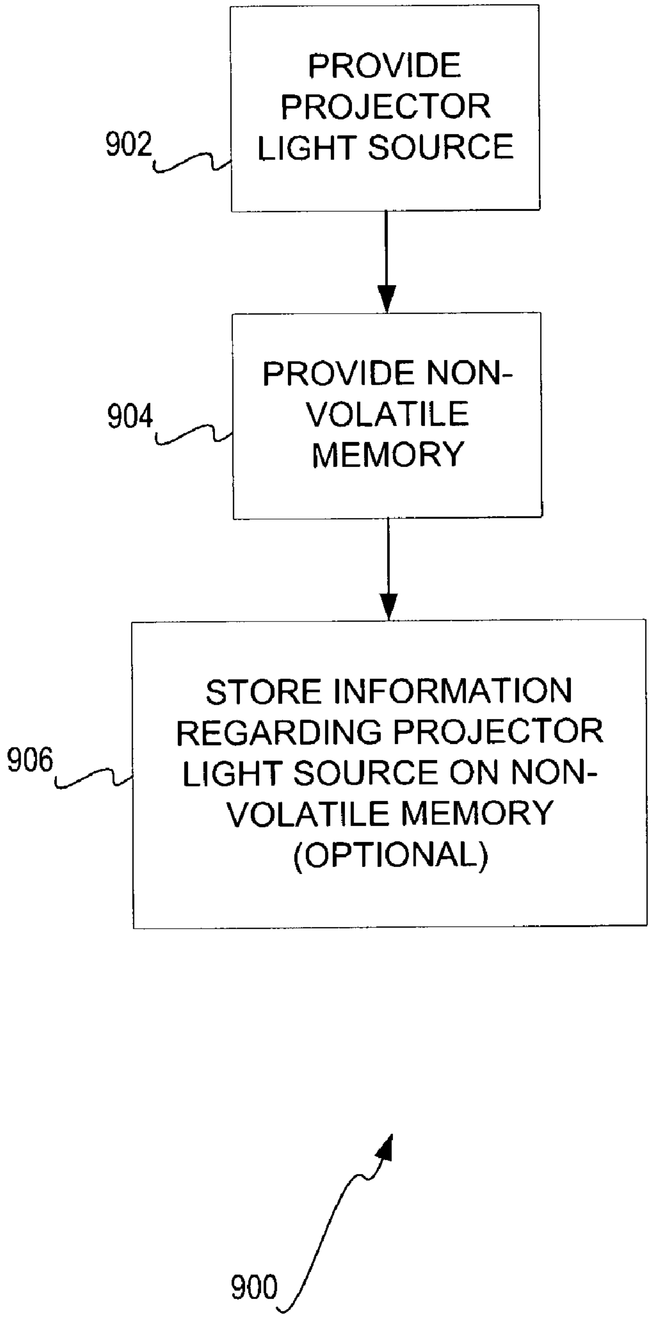
FIG. 7 is a flowchart of a method to manufacture the light source assembly depicted in FIG. 4, according to an embodiment of the invention.

FIG. 7 shows a method 900 for manufacturing the projector light source assembly 603 of the projection system 600 of FIG. 4, according to an embodiment of the invention. First, the projector light source 604 of the projector light source assembly 603 is provided (902). The light source 604 may be a light bulb, or another type of light source. Next, non-volatile memory 605 of the projector light source assembly 603 is provided (904). The non-volatile memory 605 is primarily for the projection system 600, such as the thermal sensing mechanism 610 thereof, to record the length of time the projector light source 604 has operated in accordance with a high-temperature policy, as has been described. Optionally, however, other information regarding the projector light source 604 may be stored on the non-volatile memory 605 (906). Such information can include the manufacturer and type of the light source 604, its expected useful life, and so on. For instance, the information may include various waveforms, voltage and current levels, starting strike voltage, the number of strikes needed to turn on the light source, and so on.

CONCLUSION

It is noted that, although specific embodiments have been illustrated and described herein, it will be appreciated by those of ordinary skill in the art that any arrangement is calculated to achieve the same purpose may be substituted for the specific embodiments shown. For example, although three high-temperature policies have been particularly described herein, they are only examples of high-temperature policies that may be used in conjunction with some embodiments of the invention, and other embodiments may use other high-temperature policies.

As another example, whereas a projector light source assembly of a projection system has been particularly described as a high-temperature component of a device that is amenable to embodiments of the invention, other embodiments may be utilized in conjunction with other types of high-temperature components of other devices. This application is intended to cover any adaptations or variations of the present invention. Therefore, it is manifestly intended that this invention be limited only by the claims and equivalents thereof.

I claim:

1. A method comprising:

recording all of one or more lengths of time a high-temperature component of a projection device operates in accordance with a high-temperature policy by recording an integration of an operating temperature of the high-temperature component over time; and, performing an action in response to at least one of the lengths of time the high-temperature component recorded being greater than corresponding threshold lengths of time.

2. The method of claim 1, wherein recording the one or more lengths of time the high-temperature component operates in accordance with the high-temperature policy comprises recording a length of time the high-temperature component has an operating temperature exceeding a temperature threshold.

3. The method of claim 2, wherein recording the one or more lengths of time the high-temperature component has the operating temperature exceeding the temperature threshold comprises recording a length of time the high-temperature component has the operating temperature exceeding a preset, variable temperature threshold.

4. The method of claim 2, wherein recording the one or more lengths of time the high-temperature component has the operating temperature exceeding the temperature threshold comprises recording a length of time the high-temperature component has the operating temperature exceeding a preset, non-changeable temperature threshold.

5. The method of claim 1, wherein recording the one or more lengths of time the high-temperature component operates in accordance with the high-temperature policy comprises recording a first length of time the high-temperature component has an operating temperature greater than a first temperature threshold and recording a second length of time the operating temperature is greater than a second temperature threshold.

6. The method of claim 1, wherein recording the one or more lengths of time the high-temperature component operates in accordance with the high-temperature policy comprises recording a length of time the high-temperature component has an operating temperature greater than a first temperature threshold and less than a second temperature threshold.

7. The method of claim 1, wherein recording the one or more lengths of time the high-temperature component operates in accordance with the high-temperature policy comprises recording the one or more lengths of time in a non-volatile memory of the high-temperature component.

8. The method of claim 1, wherein performing the action comprises indicating that the high-temperature component is nearing an end of a useful life period of the high-temperature component and that the high-temperature component should be replaced in the projection device with a new high-temperature component.

9. The method of claim 1, wherein the high-temperature component is a projector system projector light source assembly and the projection device is a projector system.

10. The method of claim 1, wherein recording the one or more lengths of time the high-temperature component operates in accordance with the high-temperature policy comprises recording a temperature profile of an operating temperature of the high-temperature component over time.

11. A projector light source assembly for a projection system comprising:

a projector light source; and, a non-volatile memory for the projection system storing all of one or more lengths of time the projector light source has operated in accordance with a high-temperature policy by recording an integration of an operating temperature of the projector light source over time.

12. The assembly of claim 11, wherein the non-volatile memory further stores information regarding the projector light source for use by the projection system.

13. The assembly of claim 11, wherein the non-volatile memory further is for the projection system to record a number of electrical spikes that the projection system encountered while the assembly was operating therein.

14. The assembly of claim 11, wherein the non-volatile memory further is for the projection system to record a number of strikes needed to illuminate the projector light source.

15. The assembly of claim 11, wherein the high-temperature policy deems that the projector light source have an operating temperature exceeding a temperature threshold.

16. The assembly of claim 11, wherein the high-temperature policy deems that the projector light source have an operating temperature greater than a first temperature threshold and less than a second temperature threshold.

17. The assembly of claim 11, wherein the high-temperature policy deems that a first length of time be recorded in which the projector light source has an operating temperature greater than a first temperature threshold and a second length of time be recorded in which the projector light source has the operating temperature greater than the second temperature threshold.

18. The assembly of claim 11, wherein the projector light source includes a light bulb.

19. The assembly of claim 18, wherein the projector light source further includes a reflector assembly.

20. A projector light source assembly for a projection system comprising:

a projector light source; and, a non-volatile memory for the projection system storing all of one or more lengths of time the projector light source has operated in accordance with a high-temperature policy, wherein the non-volatile memory further stores both a length of time the projector light source has operated in accordance with the high-temperature policy on alternating current (AC) and a length of time the projector light source has operated in accordance with the high-temperature policy on direct current (DC).

21. A projection system comprising:

a receptor receptive to a projector light source assembly having a projector light source;

a mechanism to project light output by the projector light source of the projector light source assembly in accordance with image data for display outside the projection system; and, a thermal sensing mechanism to record all of one or more lengths of time the projector light source of the projector light source assembly operates in accordance with a high-temperature policy, by recording an integration of an operating temperature of the high-temperature component over time, and to perform an action in response to at least one of the one or more lengths of time exceeding corresponding threshold lengths of time.

22. The projection system of claim 21, wherein the projector light source assembly further has a non-volatile memory on which the thermal sensing mechanism stores the one or more lengths of time the projector light source operates in accordance with the high-temperature policy.

23. The projection system of claim 21, wherein the high-temperature policy deems that the projector light source has an operating temperature that exceeds a temperature threshold.

24. The projection system of claim 21, wherein the high-temperature policy deems that the projector light source have an operating temperature greater than a first temperature threshold and less than a second temperature threshold.

25. The projection system of claim 21, wherein the high-temperature policy deems that a first length of time be recorded in which the projector light source has an operating temperature greater than a first temperature threshold and a second length of time be recorded in which the projector light source has the operating temperature greater than the second temperature threshold.

26. The projection system of claim 21, wherein the thermal sensing mechanism comprises one or more timers, one or more thermal sensors, and a controller.

27. The projection system of claim 21, wherein the thermal sensing mechanism comprises one or more timers, one or more thermal switches, and a controller.

28. The projection system of claim 21, further comprising a thermal regulation mechanism to cool the projector light source of the projector light source assembly.

29. The projection system of claim 21, wherein the thermal sensing mechanism detects failure of the thermal regulation mechanism.

30. The projection system of claim 21, wherein the thermal sensing mechanism, after detecting the failure of the thermal regulation mechanism, prevents the projector light source from turning on when the projection system is next turned on.

31. The projection system of claim 21, wherein the thermal sensing mechanism, after detecting the failure of the thermal regulation mechanism, prevents the projector light source from operating in accordance with the high-temperature policy.

32. The projection system of claim 21, wherein the thermal sensing mechanism, after detecting the failure of the thermal regulation mechanism, turns off at least one of the projection system and the projector light source.

33. A projection system comprising:

a receptor receptive to a projector light source assembly having a projector light source;

a mechanism to project light output by the projector light source of the projector light source assembly in accordance with image data for display outside the projection system; and, means for recording information regarding operation of the projector light source of the projector light source assembly in accordance with a high-temperature policy, including all lengths of time in which the projector light source operates in accordance with the high-temperature policy, by recording an integration of an operating temperature of the projector light source over time.

34. The projection system of claim 33, wherein the projector light source assembly further has a non-volatile memory on which the means stores the information regarding the operation of the projector light source operates in accordance with the high-temperature policy.

35. The projection system of claim 33, wherein the high-temperature policy deems that the projector light source has an operating temperature that exceeds a temperature threshold.

36. The projection system of claim 33, wherein the high-temperature policy deems that the projector light source has an operating temperature that is within a threshold temperature range.

37. The projection system of claim 33, wherein the high-temperature policy deems that a first length of time be recorded in which the projector light source has an operating temperature greater than a first temperature threshold and a second length of time be recorded in which the projector light source has the operating temperature greater than the second temperature threshold.

38. A method comprising:

providing a projector light source for a projection system; and, providing a non-volatile memory for the projection system to record all of one or more lengths of time the projector light source has operated in accordance with a high-temperature policy, by recording an integration of an operating temperature of the projector light source over time.

39. The method of claim 38, further comprising storing on the non-volatile memory information regarding the projector light source for use by the projection system.

40. The method of claim 38, wherein the high-temperature policy deems that the projector light source has an operating temperature that exceeds a temperature threshold.

41. The method of claim 38, wherein the high-temperature policy deems that the projector light source has an operating temperature that is within a threshold temperature range.

42. The method of claim 38, wherein the high-temperature policy deems that a first length of time be recorded in which the projector light source has an operating temperature greater than a first temperature threshold and a second length of time be recorded in which the projector light source has the operating temperature greater than the second temperature threshold.

43. A method comprising:

recording all of one or more lengths of time a high-temperature component of a projection device operates in accordance with a high-temperature policy, by recording both a length of time the high-temperature component has operated in accordance with the high-temperature policy on alternating current (AC) and a length of time the high-temperature component has operated in accordance with the high-temperature policy on direct current (DC).

44. A projection system comprising:

a receptor receptive to a projector light source assembly having a projector light source;

a mechanism to project light output by the projector light source of the projector light source assembly in accordance with image data for display outside the projection system; and, a thermal sensing mechanism to record all of one or more lengths of time the projector light source of the projector light source assembly operates in accordance with a high-temperature policy, by recording both a length of time the projector light source has operated in accordance with the high-temperature policy on alternating current (AC) and a length of time the projector light source has operated in accordance with the high-temperature policy on direct current (DC), and to perform an action in response to at least one of the one or more lengths of time exceeding corresponding threshold lengths of time.

45. A projection system comprising:

a receptor receptive to a projector light source assembly having a projector light source;

a mechanism to project light output by the projector light source of the projector light source assembly in accordance with image data for display outside the projection system; and, means for recording information regarding operation of the projector light source of the projector light source assembly in accordance with a high-temperature policy, including all lengths of time in which the projector light source operates in accordance with the high-temperature policy, by recording both a length of time the projector light source has operated in accordance with the high-temperature policy on alternating current (AC) and a length of time the projector light source has operated in accordance with the high-temperature policy on direct current (DC).

46. A method comprising:

providing a projector light source for a projection system; and providing a non-volatile memory for the projection system to record all of one or more lengths of time the projector light source has operated in accordance with a high-temperature policy, by recording both a length of time the projector light source has operated in accordance with the high-temperature policy on alternating current (AC) and a length of time the projector light source has operated in accordance with the high-temperature policy on direct current (DC).

* * * * *